United States Patent [19]
Belsdorf

[11] 3,986,250
[45] Oct. 19, 1976

[54] METHOD OF FORMING SEAL SECURING PORTION ON CUP-SHAPED BALL JOINT HOUSING

[75] Inventor: Manfred Belsdorf, Madrid, Spain

[73] Assignee: A. Ehrenreich & Cie., Dusseldorf, Germany

[22] Filed: May 30, 1975

[21] Appl. No.: 582,207

[30] Foreign Application Priority Data
June 7, 1974 Germany............................ 2427522

[52] U.S. Cl. ............................. 29/511; 29/149.5 B; 29/441 R; 64/32 F; 403/134
[51] Int. Cl.² .................. B21D 39/00; B23P 11/00
[58] Field of Search ............... 29/510, 511, 149.5 B, 29/441; 64/32 F; 308/239; 403/134

[56] References Cited
UNITED STATES PATENTS

| 941,032 | 11/1909 | McCarthy | 29/149.5 B UX |
|---|---|---|---|
| 1,753,465 | 4/1930 | Jacques | 29/149.5 B UX |
| 2,618,049 | 11/1952 | Flumerfelt | 29/149.5 B UX |
| 2,921,809 | 1/1960 | Kogstrom | 403/134 |
| 3,052,477 | 9/1962 | Parker | 403/134 X |
| 3,197,842 | 8/1965 | Parker | 29/149.5 B |
| 3,650,004 | 3/1972 | Bergstrom | 29/149.5 B |
| 3,656,221 | 4/1972 | Scheublein | 29/511 X |

FOREIGN PATENTS OR APPLICATIONS

| 78,008 | 1/1951 | Norway | 29/149.5 B |
|---|---|---|---|

Primary Examiner—Charlie T. Moon
Attorney, Agent, or Firm—Ernest F. Marmorek

[57] ABSTRACT

An improved method for forming a cup-shaped ball joint socket by using a blank provided with a neck portion of reduced outer diameter from which an outwardly directed collar is formed; and the cup-shaped ball joint socket resulting from practicing the improved method.

2 Claims, 3 Drawing Figures

METHOD OF FORMING SEAL SECURING PORTION ON CUP-SHAPED BALL JOINT HOUSING

BACKGROUND OF THE INVENTION

The invention relates to a cup-shaped ball joint socket and method for forming said ball joint socket. More particularly the invention relates to forming a cup-shaped ball joint socket having an outwardly directed collar. The collar is intended for use in securing a sealing device, such as a flexible bellows type seal, to said ball joint housing.

The production of ball joint housings for use with a ball joint, including a spherical end portion having a bearing journalling casing around it, and a pin extending therefrom, by inserting the end portion into a suitable blank and forming the blank around the spherical end portion using a die arrangement, is well known. This type of ball joint has found widespread use as part of a steering linkage for example in motor vehicles using a rack and pinion type steering mechanism. In order to prevent the entry of foreign matter such as dust or water into the housing, the ball joint housing may be provided with a housing cover, gasket, flexible bellows type seal, or similar devices. In use as a pivot in a rack and pinion type steering mechanism the gear rack end extending from the ball joint (pin) is usually protected by a flexible folded bellows type device, which seals the joint. Other sealing means or gaskets have also been used for this purpose.

In order to secure a sealing device to the ball joint casing, it has been found necessary to form a securing means such as a peripheral groove, on the housing at the opening through which the ball joint pin extends. The production of such a groove on a ball joint housing causes considerable difficulty and increased expense in the manufacture of the ball joint housing.

SUMMARY OF THE INVENTION

One of the principal objects of the instant invention is to avoid difficulties formerly encountered in providing a securing means for securing a sealing device to a ball joint housing. A further object is to provide such a securing means with a minimum of increased cost in terms of equipment or time in forming the ball joint housing.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel method for production of a ball joint housing and the housing formed thereby, an embodiment of the same being illustrated in the accompanying drawings and described in the specification.

The invention accordingly comprises the several steps and the relation of one or more of such steps with respect to each of the others, all as exemplified in the following detailed disclosure, and the scope of the application which will be indicated in the claims. The invention as claimed and described comprises an improvement to the normal practices in the art. By applying the teachings of the instant application, a securing means in the form of a peripheral groove, is formed in the ball joint housing by use of a modified blank, but essentially without other modification to the normal practices of the art.

BRIEF DESCRIPTION OF THE DRAWINGS

For a fuller understanding of the nature and objects of the invention, reference should be had to the following detailed description, taken in connection with the accompanying drawings, in which.

The foregoing and other objects of the invention will be best understood from the following description of an exemplification thereof, reference being had to the accompanying drawings, wherein:

DESCRIPTION OF THE PREFERRED EMBODIMENT

Figure 1:
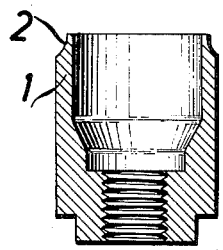
FIG. 1 is a blank according to the instant invention, before formation into a ball joint housing.
Figure 2:
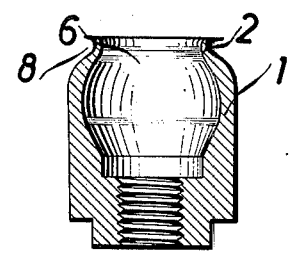
FIG. 2 is a blank after deformation, showing the peripheral groove but without the ball joint and pin, for clarity.
Figure 3:
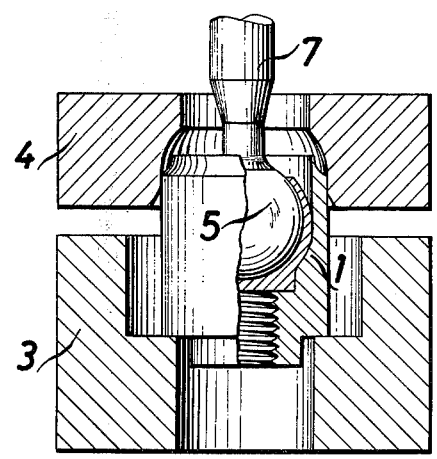
FIG. 3, partially in section, shows a ball joint inserted into a blank according to FIG. 1, which has been inserted into a die for deformation into a ball joint housing.

In carrying the invention into effect in one of the embodiments which has been selected and referring now particularly to FIG. 1, a blank 1 is provided with an extension or neck portion 2 which has a reduced wall thickness. In the preferred embodiment shown in FIG. 1, the inner diameter of this neck portion 2 is substantially the same as the inner diameter of the adjacent portion of the blank 1, while the outer diameter is of reduced dimension with respect to the adjacent blank 1. It is this neck portion which forms an outwardly extending collar thereby providing a peripheral groove 8 as shown in FIG. 2. As can be seen in FIG. 3, the ball joint housing is formed by inserting the spherical end portion 5 (with a bearing casing 8 for said spherical end portion) into the blank 1 which is inserted into the die arrangement 3,4. As can be seen in the preferred embodiment shown in FIG. 3, the lower portion of the blank conforms to the lower die 3 while the upper portion is deformed by the die 4. Die 4 exerts an inwardly and radially directed force against the blank, but no direct force against the neck portion 2. It is the combination of the reduced wall thickness neck portion and the inwardly directed forces of the die portion 4 which results in the outward directed collar portion and therefore the peripheral groove 8. The die arrangement 3,4 does not have special provisions for the formation of the peripheral groove 8 and may be the type of die arrangement normally used in forming ball joint casings from blanks.

In the preferred embodiment, when employing a usual die arrangement 3, 4, the blank 1 should be long enough to form the ball joint casing and the neck 2 extends beyond the required length. Thus the body of the ball joint casing is composed substantially of the thicker walled blank portion while the collar and peripheral groove 8 is formed from the narrow walled neck portion 2, around opening 6.

Although, in the preferred embodiment, the blank, as shown in FIG. 1, has a cylindrical configuration, this invention may be practiced on blanks having other similar configurations. With a blank according to the instant invention, the amount of deformation is minimized and is essentially affected by applying a radially inward deforming force against the blank which extends above the central circumference (around the axis of the ball joint) of the spherical end 5. Thus, as noted above, die 4 provides essentially all of the deforming force.

OPERATION

The operation of the above described embodiment of the invention is as follows:

The die 1, is provided with an integral neck portion 2 which has a reduced wall thickness and extends beyond the length of the die portion 1 normally required for forming a ball joint housing. When this specially prepared blank is used in forming a ball joint housing by deformation in a die, in the manner normally practiced in the art, a peripheral groove 8 is formed without special provision in the die arrangement 3, 4. Only inwardly directed radial forces are applied to the blank, but the result is an outwardly extending collar which forms the peripheral groove 8. The ball joint housing formed by this method has the advantage of not requiring further operations to provide a securing means for securing a sealing device thereto, as the peripheral groove 8 which forms as a result of practicing the method, is operable for use as such a securing means. Thus, the application of the improvements according to the instant invention results in a simplified and relatively inexpensive method for providing a means for securing a sealing device to a ball joint housing; and a housing having the securing device.

Having thus described the invention, what I claim as new and desire to be secured by Letters Patent is as follows:

1. An improved method for forming a cup-shaped ball joint housing with securing means for securing a sealing device to prevent entry of foreign matter, for a ball joint including a spherical end portion and a pin extending therefrom and a bearing casing for said spherical end portion, said housing being formed around said spherical end portion and provided with an opening through which said pin extends by inserting said spherical end portion into a substantially cylindrical blank and thereafter deforming said blank in a die arrangement, the improvement comprising the steps:

providing said blank with an integral neck portion extending beyond the amount of blank required to form said housing, which neck portion forms said opening;

providing said neck portion with an inner diameter substantially the same as the inner diameter of of the blank adjacent thereto;

providing said neck portion with a reduced outer diameter; and deforming the blank into said housing by directing forces inwardly radially of said spherical end portion adjacent said neck portion while refraining from applying direct force to said neck portion, whereby an outwardly extending collar is formed by said neck portion during formation of said housing, which collar defines a peripheral groove operable as said securing means for said sealing device.

2. A method as claimed in claim 1, wherein said inwardly directed force is applied to said blank between that part of the blank extending above the central circumference of the spherical end portion around the axis of the ball joint and below the neck portion.

* * * * *